United States Patent
Engels

(10) Patent No.: US 10,479,401 B2
(45) Date of Patent: Nov. 19, 2019

(54) APPARATUS FOR DETECTING FRICTION IN A POWER STEERING SYSTEM

(71) Applicant: Ford Global Technologies, LLC, Dearborn, MI (US)

(72) Inventor: Frank Peter Engels, Solingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 276 days.

(21) Appl. No.: 14/065,839

(22) Filed: Oct. 29, 2013

(65) Prior Publication Data

US 2014/0121884 A1     May 1, 2014

(30) Foreign Application Priority Data

Oct. 29, 2012   (DE) .................. 10 2012 219 714

(51) Int. Cl.
*B62D 5/04*    (2006.01)

(52) U.S. Cl.
CPC ......... *B62D 5/0481* (2013.01); *B62D 5/0496* (2013.01)

(58) Field of Classification Search
CPC .................................................. B62D 5/0481
See application file for complete search history.

(56) References Cited

U.S. PATENT DOCUMENTS

| | | | |
|---|---|---|---|
| 8,392,055 B2 | 3/2013 | Schusteritz | |
| 2007/0030134 A1* | 2/2007 | Liu et al. | 340/441 |
| 2008/0271942 A1* | 11/2008 | Yamashita et al. | 180/443 |
| 2009/0071745 A1* | 3/2009 | Itakura et al. | 180/446 |
| 2009/0294206 A1* | 12/2009 | Oblizajek | B62D 5/0472 180/446 |
| 2010/0268422 A1* | 10/2010 | Blommer | B62D 6/008 701/44 |
| 2010/0305803 A1* | 12/2010 | Schusteritz | 701/29 |
| 2011/0218710 A1* | 9/2011 | Trinh | B60R 21/0136 701/46 |
| 2014/0074345 A1* | 3/2014 | Gabay | G07C 5/08 701/31.4 |

FOREIGN PATENT DOCUMENTS

| | | |
|---|---|---|
| CN | 101296836 A | 10/2008 |
| DE | 102008043712 B3 | 4/2010 |
| DE | 102009002594 B3 | 12/2010 |
| DE | 102010036638 A1 | 2/2012 |
| DE | 102010050174 A1 | 5/2012 |
| EP | 1419081 A1 | 5/2004 |

* cited by examiner

*Primary Examiner* — Christian Chace
*Assistant Examiner* — Jordan S Fei
(74) *Attorney, Agent, or Firm* — Raymond L. Coppiellie; Burgess Law Office, PLLC

(57) ABSTRACT

A power steering system including a sensor arranged or located in the steering system. The sensor detects an acoustic vibration or an acceleration signal in the steering system during a change in the steering angle and generates a sensor signal representing the vibration or the acceleration signal. A control unit receives the sensor signal and compares the sensor signal with a threshold value to detect a fault state; for example when the sensor signal is larger than the threshold value.

20 Claims, 1 Drawing Sheet

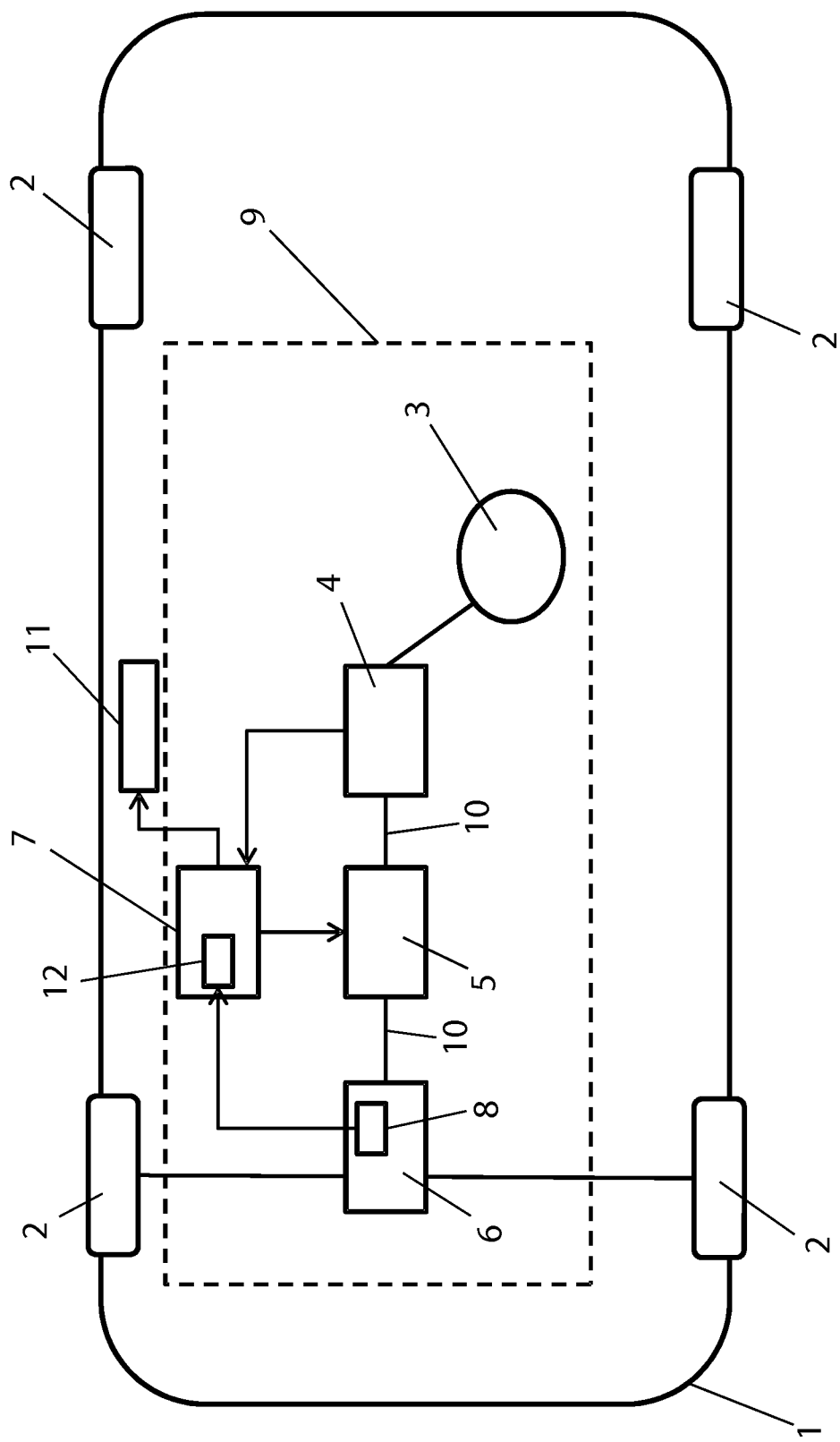

APPARATUS FOR DETECTING FRICTION IN A POWER STEERING SYSTEM

CROSS-REFERENCE TO RELATED APPLICATIONS

Not Applicable.

BACKGROUND OF THE INVENTION

1. Field of the Invention

The invention relates generally to a power steering system; and, more specifically, to an apparatus for detecting friction in a steering gear of such a power steering system.

2. Description of Related Art

Rack-and-pinion power steering systems may utilize a steering gear having a ball screw. In addition, such systems may also use electric power assistance and are typically referred to as Rack Electric Power Assisted Steering (REPAS). Due to moisture and dirt entering the steering system, in particular the steering gear, rust may form in or on the components of the steering system. In particular on the ball raceways of the steering rack, on the balls of the recirculating ball gear and on the raceways of the recirculating ball gear, all of which increases the friction of the steering system. However, since a failure of the electrical assistance is to be expected only when the formation of rust has progressed a long way and the frictional forces have increased greatly, there is no initial adverse effect for the driver. That is since the electrical assistance compensates for the friction it may not be apparent until the assistance unit fails to overcome the frictional forces. For this reason, prompt warning of the driver is therefore desirable.

Methods for detecting friction in a steering system are known; however, these methods are not capable of determining the friction within the steering gear separately from other influences such as the friction of the components connected to the steering gear; for example, the pivot bearings and shock absorbers. Therefore, such solutions require replacement of the entire steering system due to a finding of increased friction, even though the steering system itself does not exhibit any formation of rust or increased friction, that is the steering system or steering gear is undamaged. Accordingly, such methods are systems for detecting friction may lead to still functionally capable steering gears being undesirably replaced.

The object of the invention is therefore to introduce a system that detects increased friction in a steering gear of a steering system.

SUMMARY OF THE INVENTION

According to one embodiment or aspect of the invention an electrically assisted power steering system having a ball screw uses at least one sensor arranged in the steering system or in the vehicle. In this context, the sensor is designed in such a way that it detects an acoustic signal (air-borne noise) or an acceleration signal (vibration, structure-borne noise) of the steering system during a change in the steering angle and generates a sensor signal which represents the vibration/noise and transmits it to a control unit. The control unit is designed to compare the sensor signal with a threshold value and to detect a fault state if the sensor signal is larger than the threshold value.

In one example, the sensor signal is examined for the presence of a fault situation; that is to say the friction in the system or steering gear has increased to an unacceptable amount. Any reduction in the measuring accuracy, possibly caused by indirectly measuring or determining the friction, is insignificant since rough quantification of the friction or of the state of the steering gear is sufficient for the desired purpose. Since an increase in the friction of the steering gear typically involves long-term changes it is conceivable for a fault state not to be detected until it has been found that the threshold value has been exceeded at least a certain number of times within a certain time period or with respect to a certain number of steering processes. The current steering angle, from which the change in the steering angle can be derived, is usually known in any case in the control unit or can be detected by a steering angle sensor.

Further areas of applicability of the present invention will become apparent from the detailed description provided hereinafter. It should be understood that the detailed description and specific examples, while indicating one example of a preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic view of a power steering system according to the present invention in a vehicle.

DETAILED DESCRIPTION OF THE PREFERRED EMBODIMENTS

The following description of the preferred embodiment(s) is merely exemplary in nature and is in no way intended to limit the invention, its application, or uses.

FIG. 1 schematically illustrates an exemplary embodiment of a power steering system according to the present invention used with a vehicle 1 having wheels 2, two of which can be oriented for steering by a steering gear 6. In the present example, the steering gear 6 includes a ball screw, although the present invention may be used with other types of mechanical steering gears. In accordance with the exemplary embodiment, a driver of the motor vehicle 1 communicates a steering request via a steering wheel 3. A difference between deflection of the steering wheel 3 and actual deflection of the steering gear 6 can be determined by a suitable deflection sensor such as a torsion rod 4 which connects the steering wheel 3 to a steering rack 10. A control unit 7 controls an electric motor 5, arranged on the steering rack 10 and functioning as an electric auxiliary motor, in such a way that a deviation between the deflection of the steering wheel 3 and the deflection of the steering gear 6 is compensated. The steering rack 10 which is driven by the electric motor 5 then moves the steering gear 6, as a result of which the wheels 2 are oriented by the steering gear 6 as requested by the driver. As illustrated in FIG. 1 a sensor 8 is provided which measures acoustic vibrations and/or acceleration signals in the steering gear 6 and transmits a sensor signal to the control unit 7.

The sensor 8 in the exemplary embodiment may include an acceleration sensor, an acoustic sensor, a torque sensor, a position sensor and/or a power consumption sensor. While different sensors 8 can be used, it is the friction, increased by the formation of rust or the penetration of dirt particles, which generates the noise and/or accelerations occurring during continuous steering. Accordingly, the sensor 8 is one that picks up acoustic vibrations and/or accelerations in the steering system.

In this context, signals from sensors which are installed in the vehicle for other reasons can also be used beneficially for the purpose of use. In particular it is also conceivable to use a combination of the specified sensor types and to take into account their respective sensor signals jointly during the comparison of threshold values. In such a situation, the sensor signal, which ultimately represents the vibration of the steering gear 6, is a combination of individual sensor signals. Data from sensors, along with data associated with the ambient conditions such as the temperature and air humidity, can also be taken into account. This can be done, for example, when the threshold value is set as a function of the measured ambient conditions. The intensity of the friction could thus be temperature-dependent, depending on the design of the steering system, for which reason it is advantageous to adapt the threshold value correspondingly.

In an additional example, an acceleration sensor, already present in the vehicle, may also be is used. For example a sensor may include an acceleration sensor already present in an airbag triggering system.

In addition, an acceleration sensor can also be used simultaneously to detect further faults in the steering gear such as, for example, jumping over the toothed belt, "normal" wear in the steering gear (for example wear of the sliding block which can lead to rattling of the toothing) or even in an extreme case fracturing of components (for example due to incorrect handling/repair) of the steering gear.

The sensor 8 can be integrated into the control unit 7. This has the advantage that the expenditure on additional cabling is eliminated. Alternatively or additionally, the sensor 8 can be arranged on the steering gear 6, including the ball screw. Given that the most intensive generation of noise and/or the most intensive acceleration signal for fault situation detection is expected there. Accordingly the sensor 8 can generate sensor signals with increased measuring accuracy.

The control unit 7 includes a predetermined threshold value. The threshold value is preferably an amplitude value or a frequency band. In this context, the control unit 7 is operative to compare a maximum modulation of the sensor signal with the threshold value. The modulation of the sensor signal provides reliable information about the intensity of the generation of noise in the steering gear.

The control unit 7 can transmit a fault state to a human/machine interface for signaling to a driver. The transmission can occur here, for example, by means of a CAN (Controller Area Network) bus of the motor vehicle.

The control unit 7 can be designed to deactivate the electric motor 5 of the power steering system after a fault state is detected. This can occur, in particular, after a restart of the vehicle 1 which takes place after the fault state is detected, since deactivating the electric motor 5 of the power steering system during travel can entail danger to the vehicle occupants and the surroundings if the control behavior of the vehicle is adversely affected by the loss of the power assistance.

The power assisted steering system can have a filter unit 12 connected between the sensor 8 and the control unit 7 and designed to filter the sensor signal. Undesired signal components can be damped by means of the filtering, which increases the accuracy of detection of the fault state. As illustrated in the exemplary embodiment, the filter unit 12 may also be integrated into the control unit 7.

In particular, the filter unit can be designed to suppress frequency components of the sensor signal above an upper cutoff frequency. The upper cutoff frequency can be, for example, 10 kHz or less. In addition, it is also possible to provide a lower cutoff frequency below which frequency components of the sensor signal are suppressed. The lower cutoff frequency may be, for example, at least 100 Hz.

The control unit 7 suitably evaluates the sensor signal after filtering by the filter unit 12 and, as already described, detects, under certain circumstances, a fault state when friction causes an unacceptable increase in the measured generation of noise in the steering gear 6. The control unit 7 informs the driver of the motor vehicle 1 of the fault state by means of a human/machine interface 11, for example by means of a warning lamp arranged on the dashboard.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A steering system comprising:
    a steering gear;
    a sensor operative to measure acceleration of the steering gear during a change in the steering angle and to generate a sensor signal representing structure-borne noise associated with said steering gear; and
    a control unit operative to compare the sensor signal with a threshold value and to detect a fault state if the sensor signal is larger than the threshold value.

2. A steering system as set forth in claim 1 wherein said sensor is selected from a group consisting of an acceleration sensor, a torque sensor, a position sensor and a power consumption sensor.

3. A steering system as set forth in claim 1 wherein said sensor an acceleration sensor.

4. A steering system as set forth in claim 3 wherein said acceleration sensor is an acceleration sensor of an airbag triggering system.

5. A steering system as set forth in claim 1 wherein said sensor is integrated into said control unit.

6. A steering system as set forth in claim 1 wherein the threshold value is an amplitude value; and
    said control unit operative to compare a maximum modulation of a sensor signal with said amplitude value.

7. A steering system as set forth in claim 1 wherein said control unit transmits a fault state to a human/machine interface.

8. A steering system as set forth in claim 1 including an electric auxiliary motor; and
    said control unit operative to deactivate said electric auxiliary motor upon detection of a fault state.

9. A steering system as set forth in claim 1 including a filter unit, said filter unit connected between said sensor and said control unit wherein said filter unit filters a sensor signal.

10. A steering system as set forth in claim 9 wherein said filter unit is suppresses frequency components of said sensor signal above an upper cutoff frequency.

11. A steering system comprising:
    a steering gear;
    a sensor operative to measure acoustics of the steering gear during a change in the steering angle and to generate a sensor signal representing airborne noise associated with said steering gear;

a control unit operative to compare the sensor signal with a threshold value and to detect a fault state if the sensor signal is larger than the threshold value;

an electric auxiliary motor connected to steering gear; and said control unit operative to deactivate said electric auxiliary motor upon detection of a fault state.

12. A steering system as set forth in claim 11 including a filter unit, said filter unit connected between said sensor and said control unit wherein said filter unit filters the sensor signal.

13. A steering system as set forth in claim 12 wherein said filter unit is suppresses frequency components of said sensor signal above an upper cutoff frequency.

14. A steering system as set forth in claim 11 wherein the threshold value is an amplitude value; and said control unit operative to compare a maximum modulation of a sensor signal with said amplitude value.

15. A steering system comprising:

a steering gear;

a sensor operative to detect vibration in the steering gear generated by friction during a change in the steering angle and to generate a signal representing the vibration; and a control unit operative to compare the sensor signal with a threshold value and to detect a fault state if the sensor signal is larger than the threshold value.

16. A steering system as set forth in claim 15 wherein said sensor is an acceleration sensor.

17. A steering system as set forth in claim 15 wherein said sensor is an acoustics sensor.

18. A method for detecting friction in a steering system comprising the steps of:

providing a steering gear;

detecting vibration in the steering gear generated by friction during a change in the steering angle and generating a signal representing the vibration;

comparing the signal with a threshold value and generating a fault state if the signal is greater than the threshold value.

19. The method of claim 18 including the step of using an acceleration sensor to measure acceleration in the steering gear wherein the acceleration represents vibration, structure-born noise.

20. The method of claim 18 including the step of using an acoustics sensor to measure acoustics generated by the steering gear wherein the acoustics represents vibration, air-born noise.

* * * * *